(12) United States Patent
Robu et al.

(10) Patent No.: US 6,677,548 B2
(45) Date of Patent: Jan. 13, 2004

(54) SORTING METHOD, SORTING INSTALLATION AND SORTING SYSTEM

(75) Inventors: Johann Robu, Olching (DE); Robby Enderlein, Landsberg am Lech (DE); Hansjörg Geiger, Schwaz (AT)

(73) Assignee: MTS Modulare Transport Systeme GmbH, Vomp (AT)

( * ) Notice: Subject to any disclaimer, the term of this patent is extended or adjusted under 35 U.S.C. 154(b) by 137 days.

(21) Appl. No.: 09/927,768

(22) Filed: Aug. 10, 2001

(65) Prior Publication Data

US 2002/0053535 A1 May 9, 2002

(30) Foreign Application Priority Data

Aug. 11, 2000 (DE) .......................................... 100 39 394

(51) Int. Cl.[7] .................................................. B07C 5/00
(52) U.S. Cl. ........................ 209/583; 209/912; 414/237
(58) Field of Search ................................. 209/559, 569, 209/583, 584, 630, 933; 414/273, 274, 281, 285, 286, 331

(56) References Cited

U.S. PATENT DOCUMENTS

| | | | | |
|---|---|---|---|---|
| 3,884,370 A | * | 5/1975 | Bradshaw et al. | 209/900 X |
| 4,058,217 A | * | 11/1977 | Vaughan et al. | 209/559 |
| 4,786,229 A | * | 11/1988 | Henderson | 414/273 X |
| 5,411,151 A | * | 5/1995 | Sasada | 209/583 |
| 5,901,855 A | | 5/1999 | Uno et al. | 209/584 |

FOREIGN PATENT DOCUMENTS

| | | |
|---|---|---|
| DE | 197 09 232 A1 | 11/1997 |
| EP | 0429 118 B1 | 5/1996 |
| WO | WO 95/27672 | 10/1995 |

* cited by examiner

Primary Examiner—Donald P. Walsh
Assistant Examiner—Kaitlin Joerger
(74) Attorney, Agent, or Firm—Fulbright & Jaworski L.L.P.

(57) ABSTRACT

The invention relates to a sorting method for sorting objects, characterised by at least the following sorting steps: a) first sort run, in which objects are input onto parking sections of a first block of parking sections; b) second sort run, in which objects are transferred from the first block of parking sections to a second block of parking sections; and c) third sort run, in which objects are transferred from the second block of parking sections back to the first block of parking sections. The invention also relates to two alternative types of sorting installations which are suitable for carrying out the above sorting method, and to a sorting system which combines a plurality of these sorting installations.

26 Claims, 10 Drawing Sheets

ABSTRACT
SORTING METHOD, SORTING INSTALLATION AND SORTING SYSTEM

BACKGROUND OF THE INVENTION

The invention relates to a sorting method for sorting objects in a sorting installation in a plurality of sort runs. The invention also relates to sorting installations for sorting a plurality of objects in at least three sort runs, comprising: an inputting station for inputting the objects that are to be sorted into the sorting installation; an outputting station for outputting the objects that are to be sorted from the sorting installation; and a plurality of parking sections on which the objects are respectively parked until a given sort run has ended. Furthermore, the invention relates to a sorting system which combines a plurality of the aforesaid sorting installations with one another.

In general terms a sorting installation is designed to put quantities of articles that cover a large number of variations into a pre-defined sequence, using installation hardware designed to be as "lean" as possible. The sorting installation is customised to suit the user's requirements in terms of its sorting output per hour and number of parts per sort run. The sorting output per hour is a variable that depends on the conveying speed of the conveying media and the necessary spacing of the items being conveyed, e.g. in order to interpose sets of points between them. The number of parts per sort run is a variable that is adapted to the user's requirements and comprises, say, a delivery date or delivery run, one or more customers within this delivery, a required customer sequence, an article sequence specific to the customer such as sorting by article, colour, size or some other features, etc. The sorting installation may be integrated into existing types of organisers in order to carry out precisely this task. It is necessary to feed the articles for sorting into the system via an interpolation station and notify them to the installation's control system via a reading station.

Corresponding sorting installations and associated sorting methods are for example known from the publication WO 95/27672. A schematised view of such a sorting installation is represented in FIG. 10. In the case of these sorting installations a plurality of parking sections S1, S2 and S3 are arranged one behind the other, along which the objects O1, O2, O3 can be parked behind the respective associated parking section stoppers St1, St2 and St3. Different groups of objects O are parked on each of the parking sections S. Preliminary sorting into group categories can take place when the objects O are input, whereas the subsequent sort runs put the objects O into the correct sequence within the groups. Relocators R1, R2 and R3 take the objects that are to be sorted from a transfer section to the respective parking sections S. In this way a very compact sorting installation can be accomplished with a large number of decision-making points, leading to the desired sorting result.

The only drawback of this is that where a plurality of sort runs are required, before each new sort run the objects parked one behind the other have to be brought back into the starting position onto the preliminary storage section V and there held up by the preliminary storage stopper StV ahead of the first relocator R1, so as to be able to begin a new sort run. To put this another way, the parking sections S have to be cleared, all the objects O placed in a queue one behind the other, and to perform the next sort run then separated once again, i.e. released one by one from the starting position, in order to be guided by relocators R from the transfer section back to the individual parking sections. This operation is repeated as often as necessary. The maximum number of objects for sorting depends on the number of parking sections and the number of sort runs. The possible, though not essential, preliminary sorting operation, i.e. division into groups in a buffer store, where each group may contain one or more sort run groups, does not count as a sort run. What is meant here by a sort run is a sorting step that contains a step resulting in the objects not only being allocated to individual groups but also being put into the correct sequence within these groups. Both the final division of the objects into the individual groups, i.e. parking sections, and the creation of the correct sequence within these groups can only be concluded once the last sorting step has been performed.

Furthermore, so-called cascade sorting installations are known from the prior art. One such sorting installation is schematised in FIG. 11. Sorting installations of this kind are distinguished by cascades of parking sections connected in series, which in the drawing are designated as S1A . . . S4A; S1B . . . S4B and S1C . . . S4C. The numbers 1 to 4 respectively designate the number of the parking section within a cascade, and the letters A, B, C the cascade. A sort run is characterised by the transfer of the objects from a first cascade A of parking sections S1A–S4A arranged parallel to one another to the next cascade B, and so on as far as the last cascade, here C, the objects divided in sequence by groups between the various parking sections and sorted into sequence being taken thereto and removed therefrom. Filling the first block starting from a preliminary sorting section or by direct input also counts as a sort run (1st sort run). Therefore a number of cascades of parking sections that corresponds to the number of sort runs must be provided. The advantage with these cascade-type sorting installations is that they eliminate the need for a time-delay by returning the objects to the starting position before each new sort run, and the sort run takes place by direct transfer from one cascade to the next and so on. This prior art does, however, have the drawback that the space taken up by these sorting installations (constructional volume) is very great, for as many cascades must be provided as sort runs are necessary. Thus the costs of building and running them are also high, for each cascade essentially necessitates the full building cost of an entire sorting installation, with parking sections, parking controller, and segregator. Moreover, such cascade-type sorting installations are relatively inflexible because, as mentioned, the maximum number of sort runs is predetermined from an engineering aspect by the number of cascades, and the number of sections per cascade reflects the possible sorting criteria per sort run. A disadvantage also stems from the fact that the objects to be sorted must be supplied to the system in an orderly manner and already in groups.

DE 690 26 794 T2 discloses a sorting installation having a main conveying line, a main unloading line and a plurality of parking sections which are connected to the main conveying line and the main unloading line and on which the objects that are for sorting are respectively parked until a given sort run has finished.

From DE 197 09 232 A1 a sorting installation is known which involves sorting the objects that are for sorting in a plurality of sorting compartments in such a manner that a plurality of sort runs are performed one after the other in accordance with a fixed sequence.

SUMMARY OF THE INVENTION

It is the underlying object of the invention to develop the sorting method of the type mentioned in the introduction in such a way that even with a small constructional volume and modest building costs a fast sorting operation nevertheless becomes possible, and to create a corresponding sorting installation and a corresponding sorting system.

In accordance with the invention this is achieved by a sorting method for sorting objects in a sorting installation with at least the following sorting steps:

a) first sort run, in which objects are put onto parking sections of a first block of parking sections;

b) second sort run, in which objects are transferred from the first block of parking sections into a second block of parking sections; and c) third sort run, in which objects are transferred from the second block of parking sections back to the first block of parking sections.

Under a first alternative embodiment of a sorting installation operating by the sorting method according to the invention, the refinement in accordance with the invention is characterised by:

division of the parking sections into a first and second block of parking sections;

a first transfer section which connects the inputting station to the first block of parking sections in such a manner that the latter can be filled from the inputting station in a first sorting step;

a second transfer section which connects the first block to the second block in such a manner that the objects are transferred from the first block to the second block in a second sort run; and a third transfer section which connects the second block to the first block in such a manner that the objects are transferred from the second block back to the first block in a third sort run.

Under a second alternative embodiment of a sorting installation operating by the sorting method according to the invention, the refinement in accordance with the invention is characterised by:

division of the parking sections into a first and second block of parking sections;

a connection which joins the inputting station to the first block of parking sections in such a manner that the latter can be filled from the inputting station in a first sorting step;

a first set of relocators which connects the first block to the second block in such a manner that the objects are transferred from the first block to the second block in a second sort run; and a second set of relocators which connects the second block to the first block in such a manner that the objects are transferred from the second block back to the first block in a third sort run.

More than two sorting blocks may also be provided in the sorting installation if it is desired to enhance the sorting output per unit of time. In the case of more than two sorting blocks, the sorting method in accordance with the invention with the three minimum steps can also be carried out within a more complex sorting operation comprising more than three sorting steps, or take place at the start or the end of the more complex sorting operation. Any desired number of sorting steps can be chosen, which means that the FIGURE of two sorting blocks and three sorting steps is merely to be regarded as the minimum number.

The sorting method in accordance with the invention, and the two alternative sorting installations for carrying out this sorting method combine together three very essential advantages, as already intimated in the statement of the problem:

The first essential advantage is explained by the fact that the interplay between the blocks of parking sections can be repeated as often as desired and thus from the engineering aspect no limits are set in terms of the number of objects to be sorted, apart from the fact that there must be room for these objects in the sorting installation. This is in contrast to the cascade-type conveyor under the prior art, where the number of sort runs is predetermined from the engineering aspect by the number of cascades, and hence the maximum number of objects to be sorted is predetermined from the engineering aspect by the number of cascades and the number of parking sections within the cascades, each of the cascades standing for a sorting step.

As the second essential advantage the sorting installation in accordance with the invention ensures a small constructional volume, since irrespective of the number of objects to be sorted only two blocks of parking sections are needed as a minimum solution. By contrast, in the case of the cascade-type sorting installation more than two cascades may be needed in certain circumstances in order to achieve a depth of sort that extends to the individual part. This increases not only the constructional volume, but also the building and running costs, on account of the many parking sections, stoppers and controls therefor.

The third essential advantage offered by the sorting installation in accordance with the invention is a fast sort process, because for each additional sort run after the first sort run the transfer takes place direct from one block of parking sections to the second and from there back to the first, etc., and thus there is no necessity for clearing the parking sections, parking on a preliminary storage section, and separating the articles again in order to perform the next sort run, as is necessary under the prior art represented in FIG. 10.

Thus, for the first time, in terms of high sort rate the sorting installation in accordance with the invention makes it possible to enjoy the advantages of a cascade-type sorting installation as depicted in FIG. 11, but in terms of flexibility and small constructional volume makes it possible to enjoy and even top the advantages of a sorting installation as depicted in FIG. 10. Apart from this, the sorting installation in accordance with the invention can additionally be combined with a cascade-type conveyor, or else the sorting method in accordance with the invention can be added on to a sorting method for a cascade-type conveyor, or vice versa.

Corresponding advantages are provided by the sorting method in accordance with the invention, which by transferring from one block to the next and vice versa ensures a sorting process that is both fast and flexible by virtue of the fact that it permits any desired number of sorting steps for any desired sort criteria.

The range of objects for sorting is unlimited, provided the objects satisfy the criterion of being able to be individually separated. To name just one example, the objects may be clothes hangers with various items of clothing on them. These can be conveyed directly, or else in a particularly practical manner be suspended from rolling fixtures which are conveyed along a track system.

Practical refinements of the first alternative embodiment of the sorting installation in accordance with claims 8 to 17 will now be discussed:

One practical refinement is distinguished by the fact that the second and third transfer sections run in opposite directions and the parking sections extend between these transfer sections and are connected to them, with the result that the parking sections at the same time serve as relocators, which by parking and re-releasing the objects for the following sort run relocate these objects from the second transfer section to the third transfer section running in the opposite direction, or vice versa.

Advantageously the parking sections are arranged parallel to one another and within a respective block are identical in length. Advantageously all the parking sections may even run parallel to one another irrespective of which block they belong to. It is, however, also conceivable for the parking sections not to run parallel to one another within a block, but to run at an angle to one another, or even to be arranged one behind the other in a single section, or they may be offset relative to one another and their parking sections may be arranged at an angle to one another from one block to the next. The advantage of the parallel arrangement is that it means a particularly compact layout.

In accordance with one practical refinement the first transfer section runs in the shape of a C around the first block. A return section behind the second block may advantageously also open out into the first transfer section. In the case of this arrangement both blocks can be, so to speak, more or less framed by the first transfer section and return section, which makes it possible to accommodate the blocks and the transfer section and return section which surrounds them externally in a space-saving manner. Advantageously the second transfer section is arranged parallel to a portion of the first transfer section.

In accordance with a practical refinement of the invention a preliminary sorting section is connected upstream of the first block of parking sections. This makes it possible for the operator to firstly load all the objects onto the preliminary sorting section and park them there, and then to release them one by one and thus initiate the first sorting step by systematic filling of the first block; the individual parking sections of the first block each become filled with associated objects. The preliminary sorting section is not strictly necessary, since the objects may be loaded straight onto the parking sections of the first block, but offers the system the possibility of a required/actual object comparison of the loaded objects before initiating the first sort run.

The preliminary sorting section should advantageously be at least equal in length to the sum of the lengths of the parking sections of the first block.

As already explained above, in order to achieve an even higher sort rate it may be useful to provide not just two blocks of parking sections, but three or more blocks of parking sections; the interplay can then also take place simultaneously between a plurality of blocks in each case. Paradoxically, with a higher number of blocks it is even possible to reduce the hardware employed by reducing the parking sections and thus the numbers of points. A more detailed explanation is to be found in the exemplifying embodiments depicted in FIGS. 6 and 7.

A greater number of objects capable of being loaded onto the sorting installation in the inputting step can be achieved in a straightforward manner by interposing a buffer store in the first transfer section, which store in turn features a plurality of buffer store parking sections. For example, the buffer store may consist of a number of parking sections running parallel to one another, and for each sorting operation (which includes a plurality of sort runs) the quantity of objects to be sorted per sorting operation can be loaded onto one of the parallel buffer store parking sections, or else a plurality of groups for one respective sorting operation may even be arranged on the individual buffer store parking sections.

Even greater flexibility is obtained by configuring the buffer store in accordance with a practical refinement in such a way that one or more parking sections are each a constituent part of a closed circuit which is connected to the first transfer section. In this way objects from the buffer store can systematically be loaded onto the transfer section, that is to say for example systematically an individual object or a group of objects loaded from a given buffer store parking section onto the transfer section at the desired point in time, although these buffer store parking sections (or rather buffer store circuits) may be filled in a random fashion.

The second alternative embodiment of the sorting installation as claimed in claims 18 to 24 will now be discussed, detailing only those features of said alternative embodiment which have not already been explained above in relation to the first alternative embodiment and which apply correspondingly in respect of the second alternative embodiment:

According to one practical refinement the first and second block of parking sections incorporate parking sections connected one behind the other in series, with the parking sections of the first block being adapted to be filled in the opposite direction to the parking sections of the second block, and vice versa.

In an advantageous manner at least one of the relocators forms part of a parking section or a complete parking section. Advantageously at least one of the parking sections of the first block runs parallel to at least one of the parking sections of the second block. It is even possible for all the parking sections of the first block to run parallel to all the parking sections of the second block. To put this in simple terms, the objects can be parked on parking sections of any desired form, i.e. straight sections or curved sections, or the relocators, which in a straightforward scenario constitute a length of track which is preferably curved and is joined to the straight length of track by means of points. The relocators may also be configured as a transfer wheel. In an extreme scenario the relocators are configured to be elongate, predominately straight and parallel to one another, and act as the only parking sections, thereby resulting in the above first alternative embodiment of the sorting installation in accordance with the invention.

As with the first alternative, advantageously a preliminary storage section may be disposed upstream of the first block of parking sections, the length of the preliminary storage section advantageously being at least identical to the sum of the lengths of the parking sections of the first block.

If a plurality of sorting installations are disposed in series one behind the other or connected in parallel by means of a transfer section connecting same, this then results in a practical sorting system.

There now follows a discussion of the sorting method in accordance with the invention as claimed in claims 1 to 7:

In an especially practical manner in terms of the desired high ratio of the number of objects sorted in a sorting operation to the constructional volume, and the sorting rate due to short paths, i.e. avoiding unnecessary routing, the sorting method in accordance with the invention is refined in such a way that the parking sections of the first block are uniformly filled in the first sort run, and in the subsequent sort runs the uniform filling of the parking sections of the first and second block is retained irrespective of the number of sort runs. The positive result thereby achieved is that even after the last sort run has been completed, all the parking sections of the particular block on which the objects that have been sorted into groups and into sequence within the groups are situated can be filled completely. This on the one hand prevents the parking sections from being unnecessarily long, which would otherwise be caused by some parking sections being filled with many objects, while others are almost or half empty, and on the other hand it means that no long routes have to be taken along unnecessarily long parking sections during the sorting process, and this measure also results in the smallest possible constructional volume.

The number of objects to be sorted as a maximum is calculated by taking the number of parking sections of a block as the base, to the power of the number of sort runs as the exponent.

In an advantageous manner exactly three, or more than three, sort runs may be carried out. As has already been explained, it is particularly advantageous to always observe uniform filling of all the parking sections of a respective completely filled block via all the sorting steps, irrespective of the number of sort runs.

If all the objects that are to be sorted are parked on a preliminary storage section ahead of the first block, this offers the advantage of already accomplishing the first sort run along with the filling of the first block of parking sections, and in the inputting step possibly loading the objects already pre-sorted onto the preliminary storage section. Irrespective of the operation of the sorting installation, the inputting of the objects onto the preliminary storage section can be done manually. If it is desired to input a larger number of objects in the inputting step than can be dealt with by the sorting machine in a sorting operation, it is advisable to input them into a buffer store.

A further enhancement of output and flexibility in sorting is achieved by the fact that a plurality of sorting installations as claimed in claims 8 to 24 are connected in series behind one another or in parallel with one another by means of a transfer section (26) which connects them together. This creates a sorting system in which a large number of sorting operations can take place in parallel.

The sorting installation in accordance with the invention, and with the aid thereof the sorting method in accordance with the invention, will now be explained in detail with the help of the drawing, wherein:

DETAILED DESCRIPTION OF THE PREFERRED EMBODIMENTS

Figure 1:
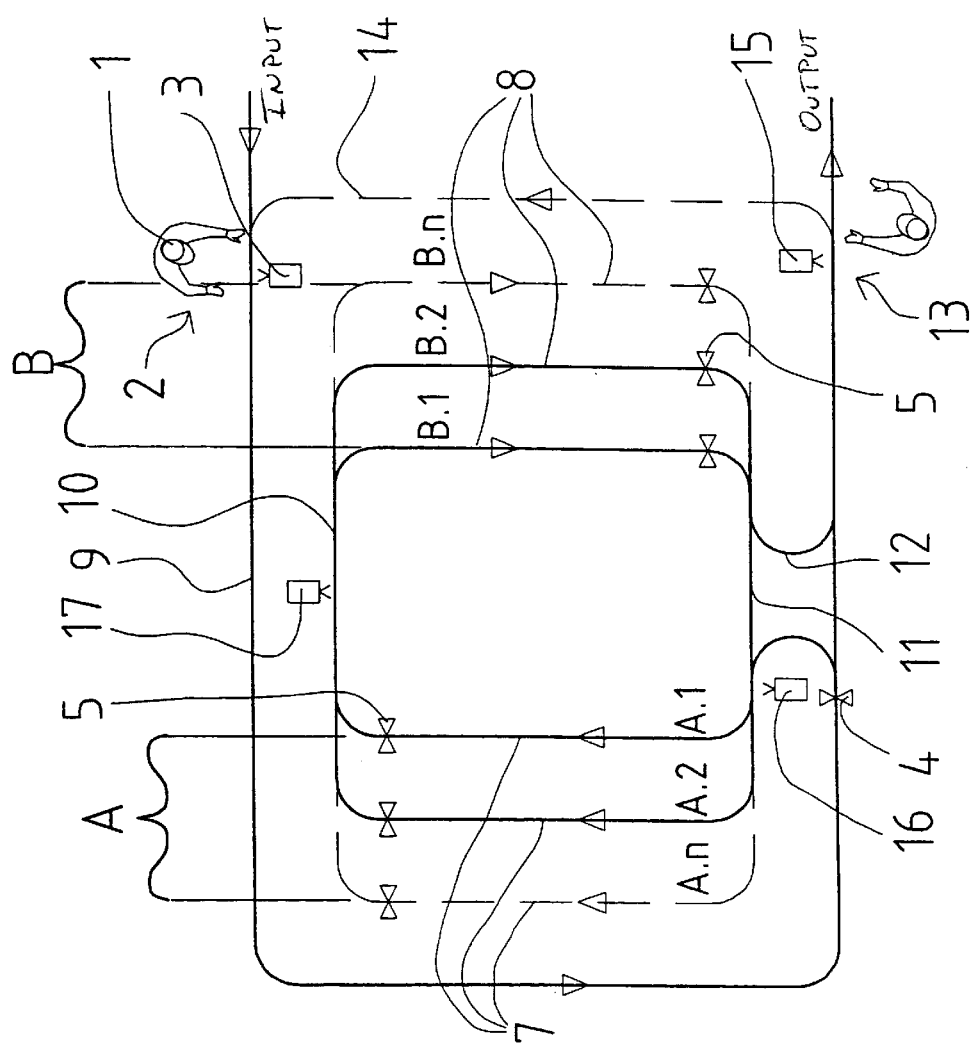
FIG. 1 shows a straightforward embodiment of the sorting installation according to the invention.

FIG. 1 shows the schematised layout of a sorting installation in accordance with the invention. At the loading station 2 the loading operator 1 loads in the objects to be handled. The objects are registered by means of the reading station 3. The objects can be all kinds of objects. The sorting installation may for instance be a suspension-type conveyor installation. This suspension-type conveyor installation may incorporate a large number of rolling fixtures which can be individually separated and conveyed separately from one another along the transfer sections by a driver. The rolling fixtures may be separately uncoupled from their respective drivers and/or coupled thereto for onward transfer. The preliminary storage stoppers 4 and the parking section stoppers 5 are used to park the objects. The arrows represented in FIG. 1 symbolise the direction of transfer.

Parking sections 7 belong to a first block A of parking sections, whereas parking sections 8 belong to a second block B of parking sections.

The loading station 2 is connected to the first block A of parking sections 7 by means of a first transfer section 9. The first block A of parking sections 7 is connected to the second block B of parking sections 8 by means of a second transfer section 10. The second block B is connected to the first block A of parking sections 7 by means of a third transfer section 11.

Furthermore, the second block B of parking sections 8 is connected by means of a discharging section 12 to the discharging station 13, by means of which objects parked by the stoppers 5 on the parking sections 8 of the second block B can be taken off, for example by sequentially emptying one parking section 8 after the other. Another option is to provide a return section 14 by means of which empty rolling fixtures can be returned to the loading station for re-filling once the sorted objects have been removed. A reading station 15 may register the objects on their way out at the discharging station. The other reading stations 16 and 17 on the first and second transfer sections, respectively, are used to sort the objects.

Before still further details of the sorting method are given, this will now be explained briefly below: At the loading station 2 the operator 1 places objects (not shown) onto the first transfer section 9, which encloses the first block A of parking sections 7 in the shape of a C, and in this exemplifying embodiment the objects are held parked up by the preliminary storage stopper 4. After this they can be individually separated, and at the reading station 16 or even earlier at the reading station 3 it can be decided onto which of the parking sections 7 a specific object is respectively to be guided. Sets of points can be used for this. The first sort run is carried out by individually separating the objects behind the stopper 4, registering them, for instance with the reading station 16, and then systematically conducting the objects onto the various parking sections 7; each of the parking sections 7 contains those parts that are relevant for this sort run. For instance, the parking sections 7 of the first block A may also be filled "at random", and correspondingly a preliminary store and preliminary storage stopper may be dispensed with. "Filled at random" here means that none of the parking sections has assigned to it a group of objects to be segregated out, as is for example the case with the prior art cascade-type conveyor discussed in the introduction.

Therefore the final distribution to the individual parking sections may also only take place during the last sort run. Once block A has been filled in this way, the objects are guided along the second transfer section 10 onto the parking sections 8 of the second block B. Blocks A and B can have any desired number of parking sections, as is indicated by the designations A.1, A.2 . . . A.n, and B.1, B.2 . . . B.n. Advantageously, though likewise not necessarily, the number of parking sections in block A and block B is identical.

The first sort run therefore takes place by filling block A, the second sort run by transferring the objects from block A to block B, the third sort run by transferring the objects from block B via the third transfer section 11 to block A, the fourth sort run by once more transferring the objects from block A back to block B, etc. Depending on the number of sort runs required, the final sort may already have taken place after the third sort run, after which the parking sections 8 can be emptied sequentially via the outputting section 12. If a final sort has still not been accomplished, which on the one hand depends upon the number of objects that are to be sorted, and on the other hand on the number of parking sections, any desired number of further sort runs will be required, for instance the third sort run by transferring back from block B to block A, the fourth sort run by transferring back from block A to block B, etc.

The sorting method will now be described in further detail:

The articles to be sorted are accumulated for the forthcoming sort run, e.g. number of 4711-29 article items, number of 4712-13 article items, etc., taken from an external warehousing system and in total making up the required number of items to be sorted; it is not, however, necessary to supply the articles to the system in a given order. The information as to which articles will pass to the system for the next sort run can be notified via a suitable data transfer interface from the user's computer to the installation's control system before the start of the interpolation process, in the form of a sort run number and a data set which contains the customer distribution code, the article series, etc. A condensed form of the same sorting list is made available to the operator who feeds the items into the system. This shows only the number of articles/feature, e.g. number of 4711-29 article items, number of 4712-13 article items, etc. The operator can pick out these articles by the optimum route and start the interpolation process. Before the interpolation process starts it is merely necessary to notify the system of the sort run number. Thus a tally can automatically be made between the articles to be taken and the articles actually taken. For this purpose a pre-parking section is provided between the interpolating station and the entrance to the first block of the sorting installation, and this pre-parking section is identical in capacity to the capacity of the sum of the individual sections of the first sorting block. Once the interpolation process has ended, the operator notifies the system of this fact. If the number of parts tallies, sorting begins automatically. If, conversely, too many items of individual articles have been supplied to the system, these are then automatically extrapolated. If items are missing they can be added in, or if they cannot be added in because there are none available in-house, they will be deleted from the delivery to individual customers. This is notified via the corresponding data transfer interface of the user's computer for preparing the delivery notes.

The flow of items can be stopped and re-started via suitable stop devices, and points can be used to alter the transfer direction within the system. The depicted reading stations are used to verify the actual status in the system, or rather the control system is used to take decisions about which points to switch over, which stoppers to open or close, etc.

It is the object of the sorting process to put the articles, which following interpolation are lying on the pre-parking section in a random actual order relative to their desired final item number, into a defined desired item number after sorting, and thus to satisfy the predetermined sort criteria. The article features are added to the item number virtually and thus provide the sort result. Customer divisions or other relevant notices are displayed to the operator when (s)he extrapolates the goods from the system.

The number of parts per sort run is specified by the system manager. The design of the sorter is undertaken on the basis of this instruction and in dependence on the required hourly sorting output (number of items per hour) and the machine output being operated at. The number of interplays between the blocks plays a crucial role in this design. If, for example, block A consists of three sections, three parts could be put into the desired item sequence 1-2-3 by moving article 1 in section A.1, article 2 in section A.2 and article 3 in section A.3. However, such cases do not arise in practice, and as a rule 500 or 1000 or more parts per sort run will be handled. Taking the example of 500 parts per sort run and assuming that the sorting output is to be approximately less than or equal to the handling output, then a maximum of two interplays between block A (moving in and distributing) and swapping to block B (moving in and distributing) are needed, with immediate extrapolation of the sorted parts and follow-on by the next sort run.

In order to explain the layout of the installation, a comparative example with two sort runs will now be explained: In order to be able to sort the stated quantity of 500 parts in just two sort runs, the square root of 500=22.36, rounded up to 23, parking sections per block are necessary. In this layout the maximum number of articles per sort run is thus 23 sections per block as the base with 2 interplays (exponent 2)(i.e. $23^2$)=529 parts. Each parking section per block must cover 23 parts (529:23=23). A specific distribution code in the interplays means that each x (desired number) final desired item number for an article can be achieved. The final desired item number is only obtained with the final block changeover. The distribution code is so constructed that when swapping from block A to block B and vice versa, in the case of a plurality of interplays, for example section A.1 is always completely emptied first, then A.2 is completely emptied as far as A.n, in order to thus achieve a higher transfer output.

Staying with the example of 500 parts per sort run, and if the sorting output is to be approximately less than or equal to half the transfer output, then a maximum of 4 interplays between block A to block b, back to block A and back to block B with immediate extrapolation of the sorted parts and follow-up by the next sort run are necessary. At the 3rd sort run the flow of the parts being sorted crosses the parts waiting in a queue on the pre-parking section for the next sort.

In the case of 500 objects to be sorted in 4 sort runs, the fourth root of 500=4.72, rounded up to 5 parking sections per block are needed. The maximum number of articles per sort run in the case of this layout is thus 5 sections per block as the base to the power of 4 interplays (exponent 4)(i.e. $5^4$)=625 parts. Each parking section/block must cover 100 parts (5*100=500), but in order to make use of the available options may be designed for up to 125 parts (625:5=125).

The depicted connection between the extrapolating station and the interpolating station is necessary if coded carrying units are used between the goods being handled and the handling installation. These carrying units become free at the point of extrapolation and are supplied to the interpolation point to be loaded up again.

It is important that the arrangement of the incoming section and the outgoing section to the blocks does not cause the goods flows to cross.

Figure 2:
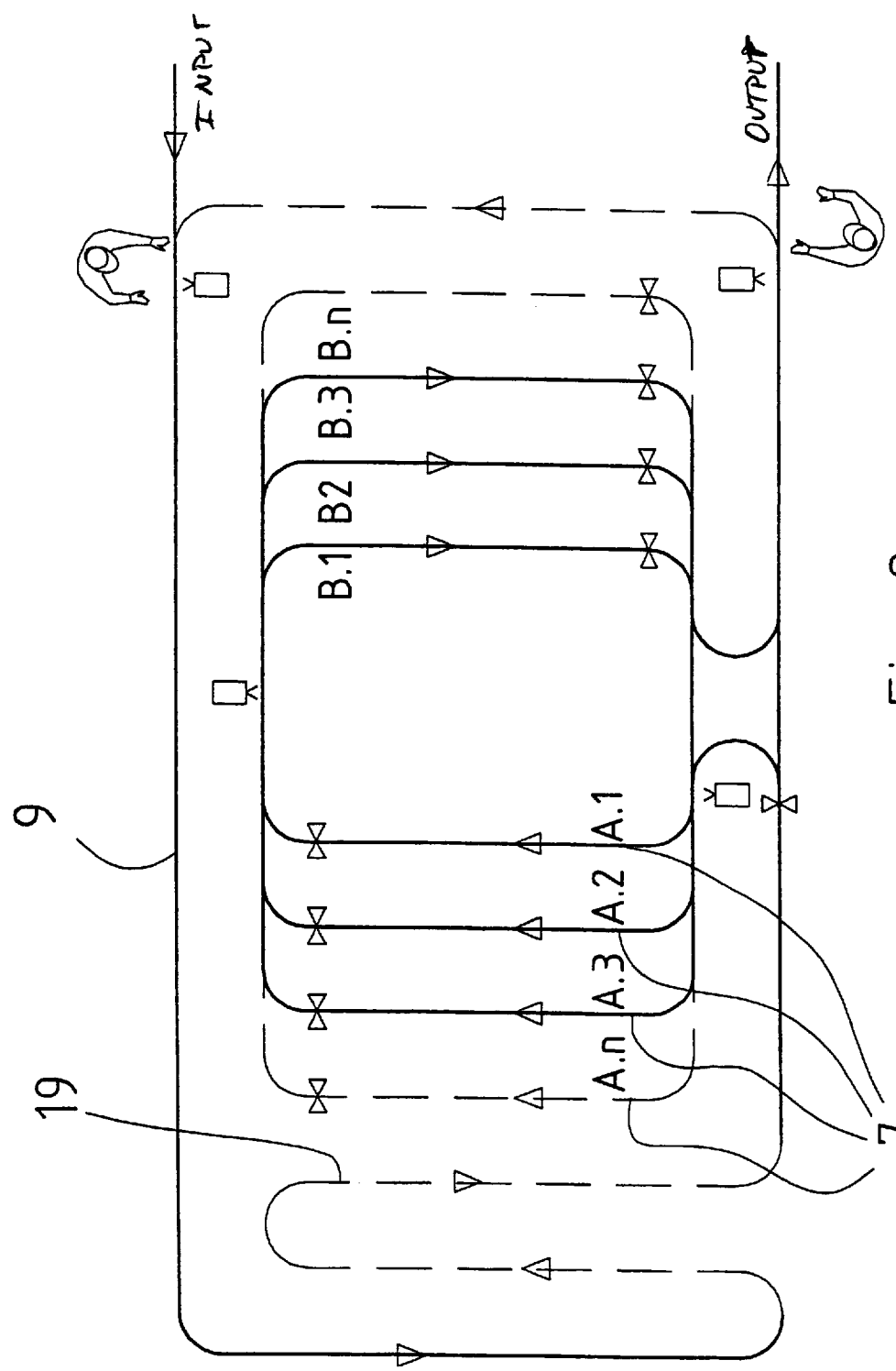
FIG. 2 shows another embodiment of the sorting installation according to the invention, in which an additional preliminary storage section is provided.

FIG. 2 is a schematic showing that it is useful if the length of the preliminary storage section matches the overall length of all the parking sections 7, any number of which may be provided, as indicated by the designations A.1, A.2, A.3 . . . A.n. As the preliminary storage section it is possible to use the first transfer section 9, which in order to provide the required length may have a meandering course with one or more preliminary storage section loops 19. In other respects the embodiment seen in FIG. 2 is the same as that in FIG. 1, enabling the same reference numbers to be used as in FIG. 1.

Figure 3:
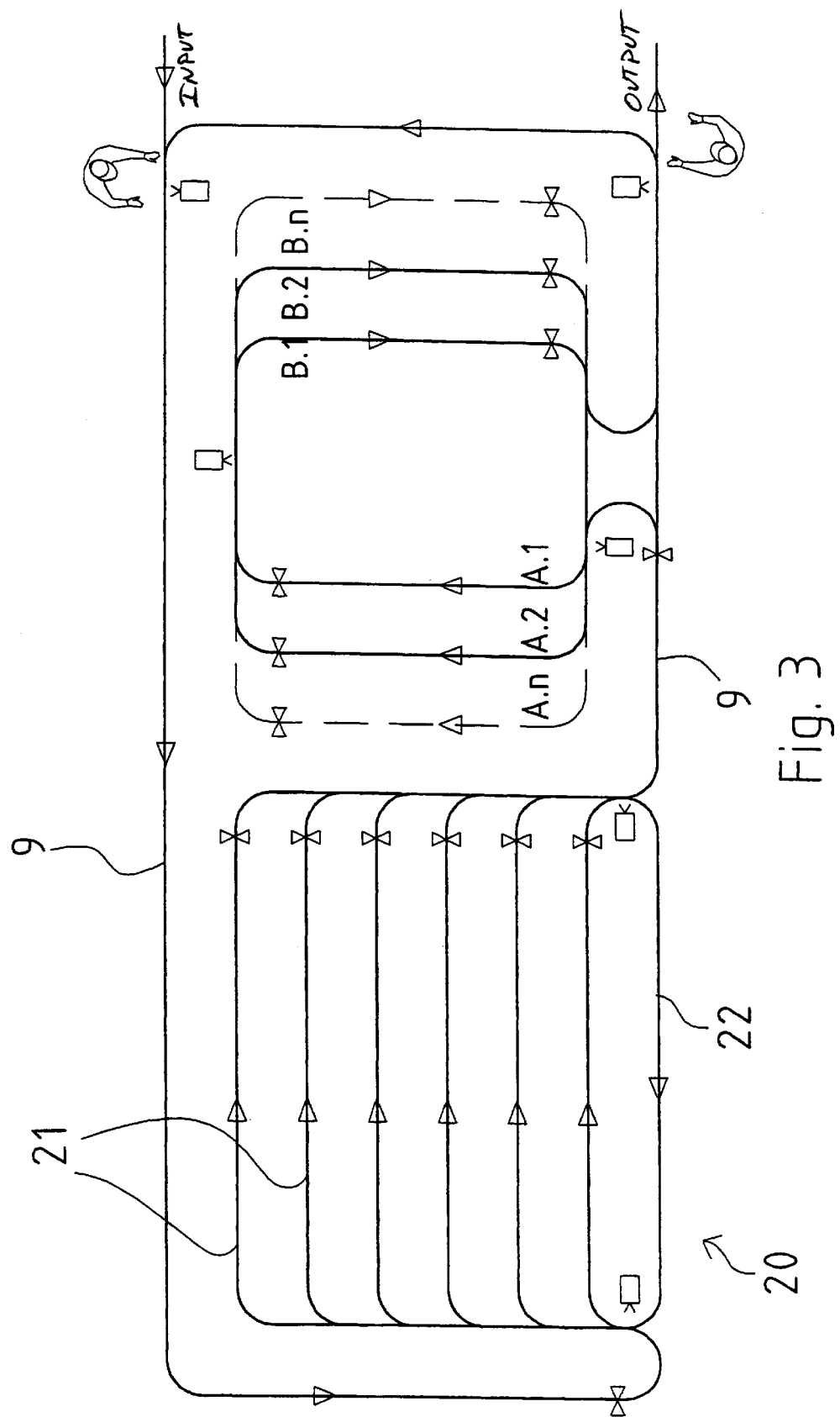
FIG. 3 shows another embodiment of the sorting installation according to the invention, in which a buffer store with buffer store parking sections running parallel to one another is arranged upstream of the blocks of parking sections.

FIG. 3 depicts an embodiment in which a buffer store 20 has been interposed in the first transfer section 9. The buffer store 20 has a plurality of buffer store parking sections 21, only two of which are identified in the drawing by way of example. A layout of this type may be useful if for example 500 parts are defined for a sort run, but the quantity scheduled for delivery is 5000 parts. A buffer store parking section in each case releases the quantity from a sorting operation, which may be made up of a plurality of sort runs. However, a buffer store parking section may also include two or more sort quantities. A pre-selection can take place on a return section 22 which returns articles that are not required to the original section.

Figure 4:
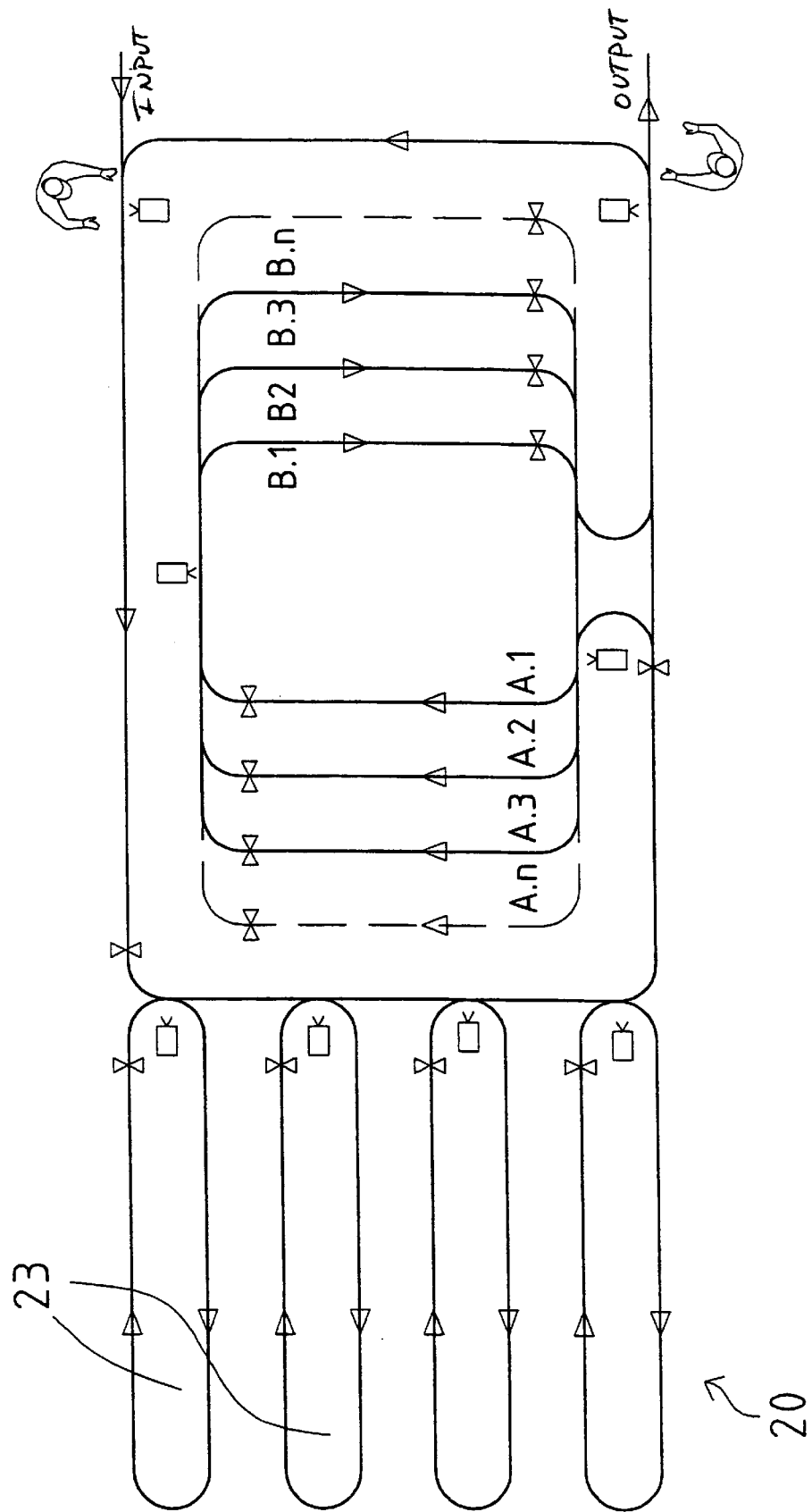
FIG. 4 shows another embodiment similar to FIG. 3, with the buffer store parking sections each forming a constituent part of a circuit of their own.

According to the embodiment seen in FIG. 4, the buffer store 20 is configured in such a way that the buffer store parking sections are each a constituent part of a closed circuit 23, two of which are identified by the reference number 23 by way of example in the drawing. In this way it is possible to store a plurality of sort quantities from the inputting station in an external random buffer store. This is useful when, for example, a distribution code has not yet been set up, but the articles are already ready to be delivered to the customer. Once the distribution code is set up, the circuits turn and release the next complete sort quantity to the actual sorting mechanisms of the sorting installation, here initially to block A of parking sections.

Figure 5:
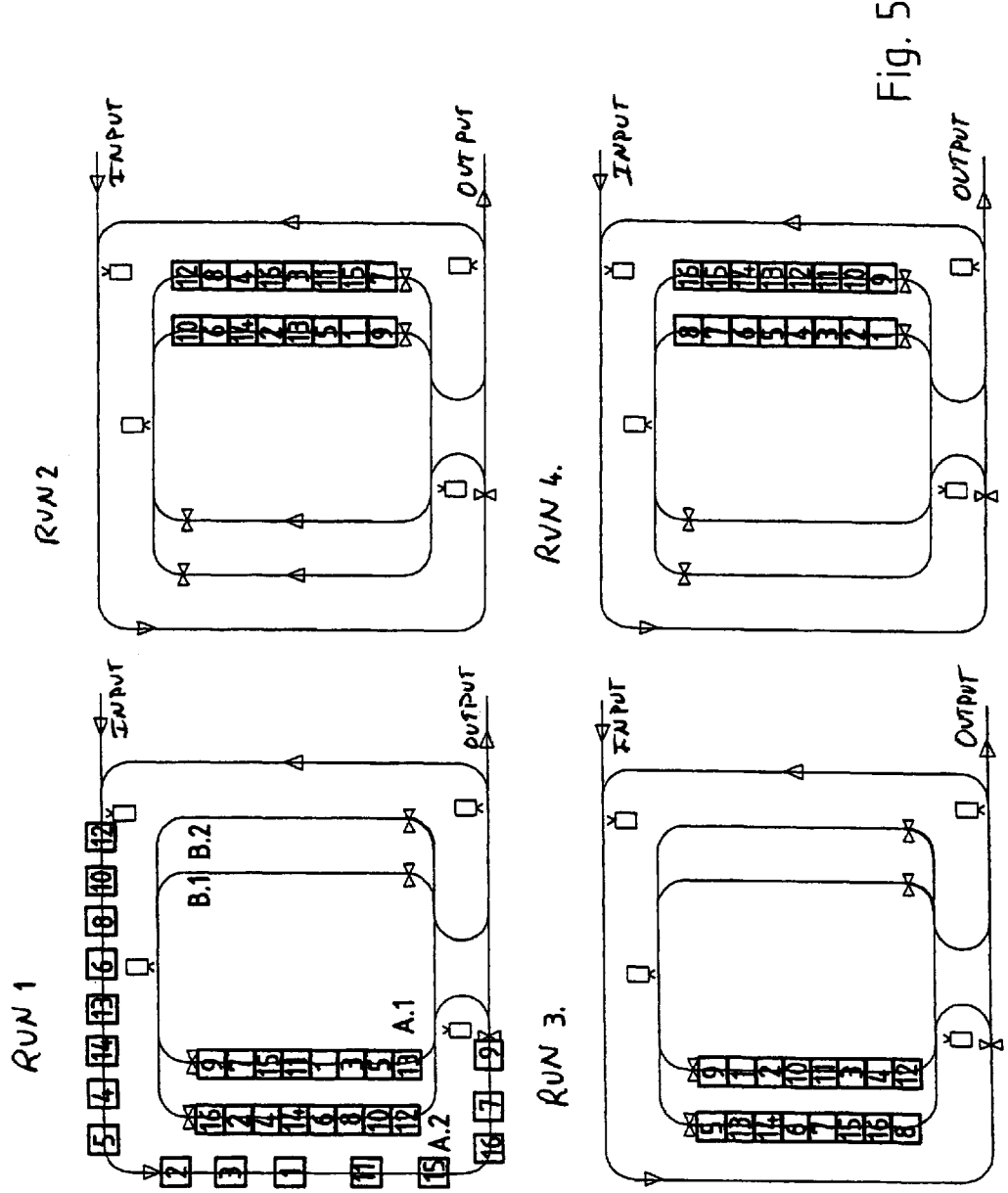
FIG. 5 shows a schematised view of a straightforward sorting operation involving four sort runs and two parking sections in each of the two blocks, with the result that 2 (number of parking sections per block) to the power of 4 (number of sort runs) which equals 16 objects can be sorted.

The example in FIG. 5 contains four sorting steps and hence a dual back-transfer to a block already used previously and empty before the start of the back-transfer. FIG. 5 uses an example selected at random to show how 16 articles are sorted to produce a desired numerically represented sequence 1-2-3-4-5-6-7-8-9-10-11-12-13-14-15-16 from the random pre-existing sequence 9-7-16-15-11-1-3-2-5-4-14-13-6-8-10-12 by means of four sort runs. To this end the objects are parked in a random sequence ahead of the preliminary storage stopper, and then systematically moved one by one onto the parking sections of the first block A, which completes the first sort run. In the second sort run the objects are guided over the second transfer section into the second block B of parking sections. The two blocks A and B each have two parking sections. The third sort run is the first back-transfer to a previously utilised block, namely the transfer from block B to block A, and the fourth and final sort run is a second back-transfer from block A to block B. This enables 16 objects to be sorted, namely 2 sections as the base, to the power of 4 sort runs as the exponent (i.e. $2^4$)=16 objects.

The starting point in the above description was only two blocks of parking sections. To once again highlight the major difference in the hardware deployed: In the case of two sort runs and up to 529 parts to be sorted, this for example means hardware deployed of 23 sections×2 blocks×2 sets of points=92 sets of points; in the case of up to 625 parts to be sorted in 4 sort runs 5 sections×2 blocks×2 sets of points=20 sets of points.'

To reiterate, for example 500 parts were put through in 2 sort runs respectively having 23 sections per block and with 4 sort runs, i.e. 5 sections per block. In Example 1 the hardware required is 23×2 sections=46 sections×2 sets of points=92 sets of points. Under Example 2, 10 sections and 20 sets of points are required, but this is offset by the fact that in Example 2 only half the sorting output is available.

In order to achieve a high sorting output with little hardware deployment, there is the alternative option of increasing the number of blocks. Staying with the example of 500 parts per sort run and specifying that the sorting output is to be approximately less than or equal to the transfer output, three or four or more sort runs with a corresponding number of blocks are then also possible.

Figure 6:
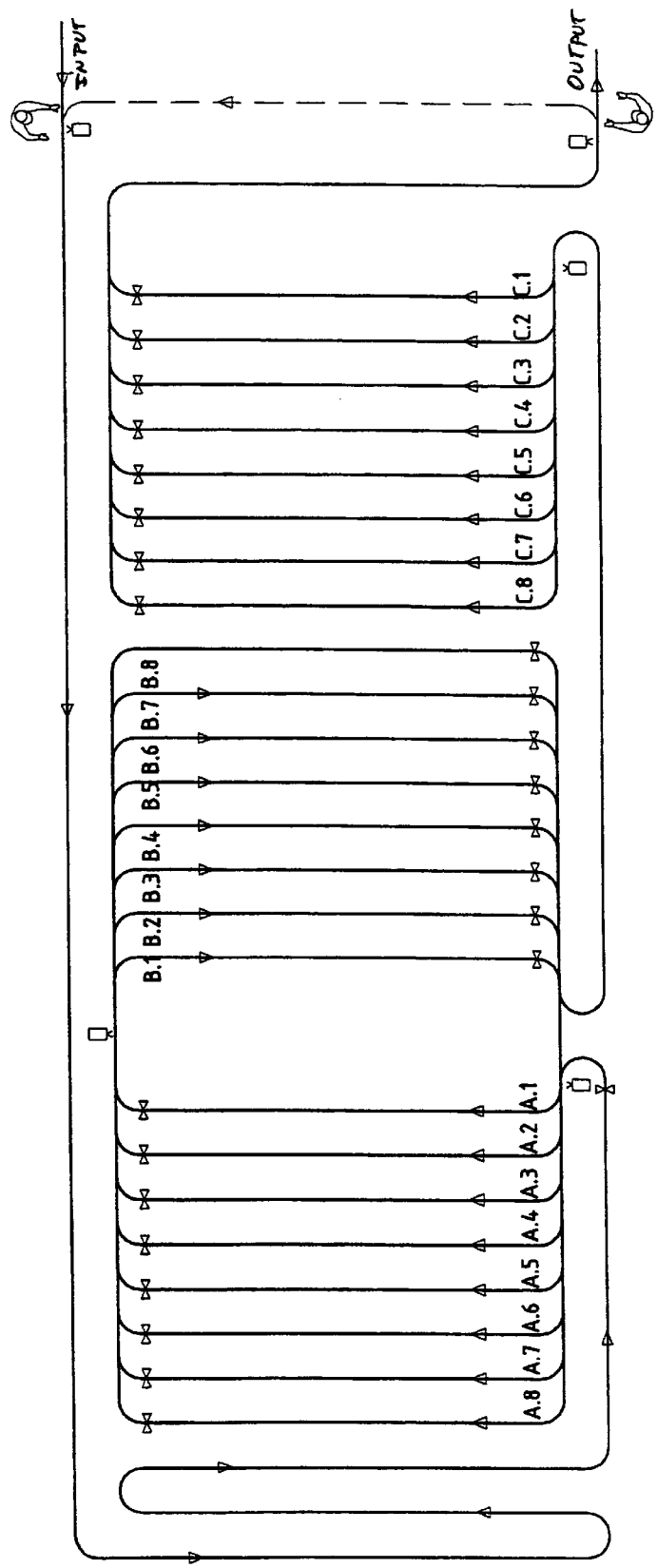
FIG. 6 shows an exemplifying embodiment in which three blocks of parking sections are provided.
Figure 7:
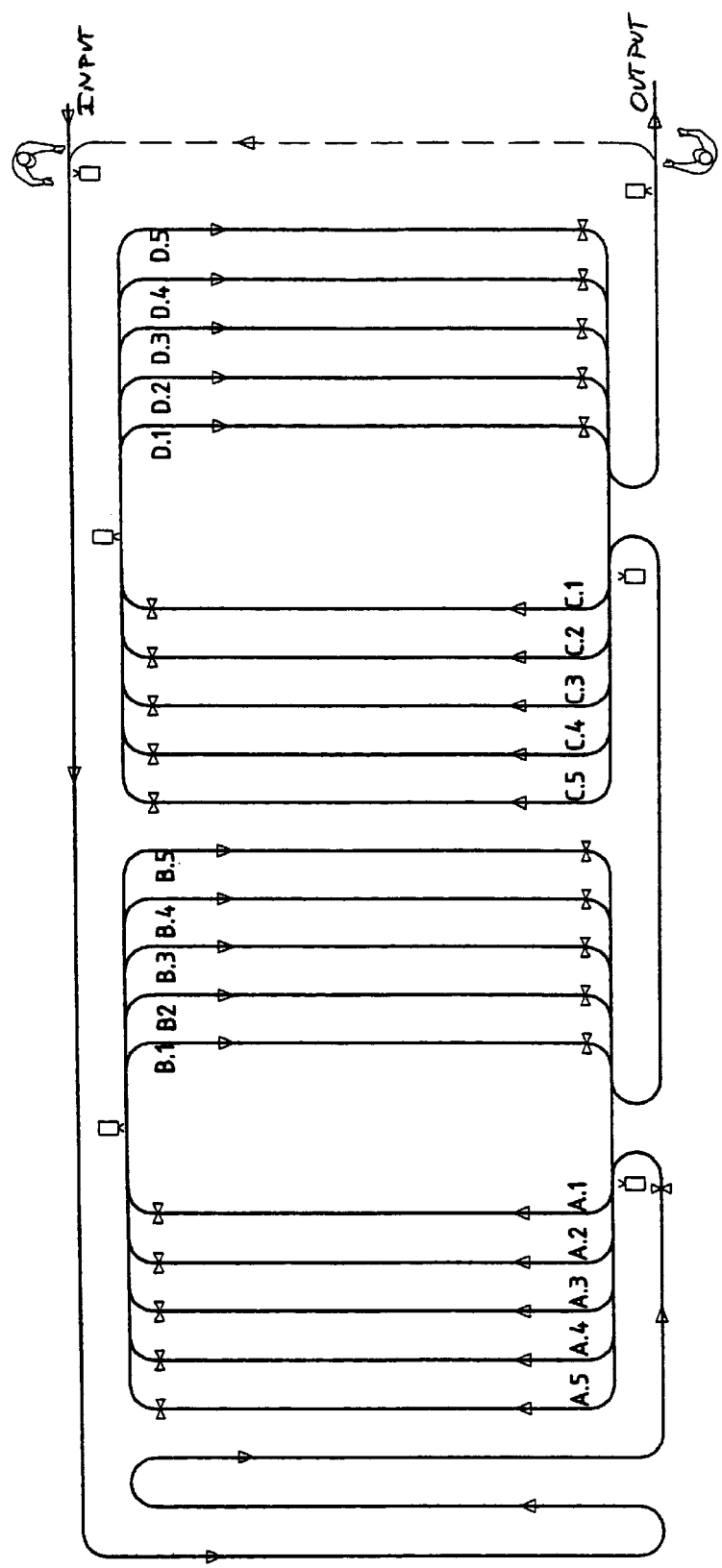
FIG. 7 shows an exemplifying embodiment in which four blocks of parking sections are provided.

The exemplifying embodiment seen in FIG. 6 depicts three blocks of parking sections, while the embodiment in FIG. 7 depicts four blocks. In the case of the exemplifying embodiment seen in FIG. 6, a back-transfer from the middle to the first (left-hand) block is possible. In the exemplifying embodiment seen in FIG. 7, a left-hand and a right-hand pair of blocks are provided, within which a back-transfer becomes possible.

If no back-transfer were possible, i.e. if in the exemplifying embodiment seen in FIG. 6 only three sorting steps were necessary, in other words if filling of the 1st (left-hand) block, transfer from the 1st (left-hand) to the 2nd (middle) block, and finally transfer from the 2nd to the 3rd (right-hand) block were sufficient for the sorting operation, then as an arithmetic example the layout of the sections would appear as follows: Given 500 objects to be sorted, each block must incorporate the cube root of 500=7.94, rounded up to 8, sections per block. The maximum number of articles per sort run in this layout is thus 8 sections per block as the base, with 3 interplays (exponent 3)(i.e. $8^3$)=512 parts. Each sorting section per block must take 64 parts (529:8=64). On account of the specific distribution code in the case of the sort runs, any x final desired item number for an article can be achieved. Equipment used: 8 sections×3 blocks×2 sets of points=48 sets of points.

In the case of the exemplifying embodiment seen in FIG. 7 with four blocks, in the absence of back-transfer this would specifically mean that each block must have the fourth root of 500=4.73, rounded up to 5, parking sections, in order to be able to sort 500 parts. With this layout the maximum number of articles per sort run is thus 5 sections per block as the base, with four sort runs as the exponent, i.e. 5 to the power of 4 ($5^4$)=625 parts. Each sorting section per block is able to take 125 parts (625:5=125). The equipment used is 5×4=20 sections×2 sets of points=40 sets of points.

Back-transfers within the stated pairs of blocks seen in FIGS. 6 and 7 increase the number of sort runs and correspondingly reduce the number of sections and thus sets of points required.

Figure 8:
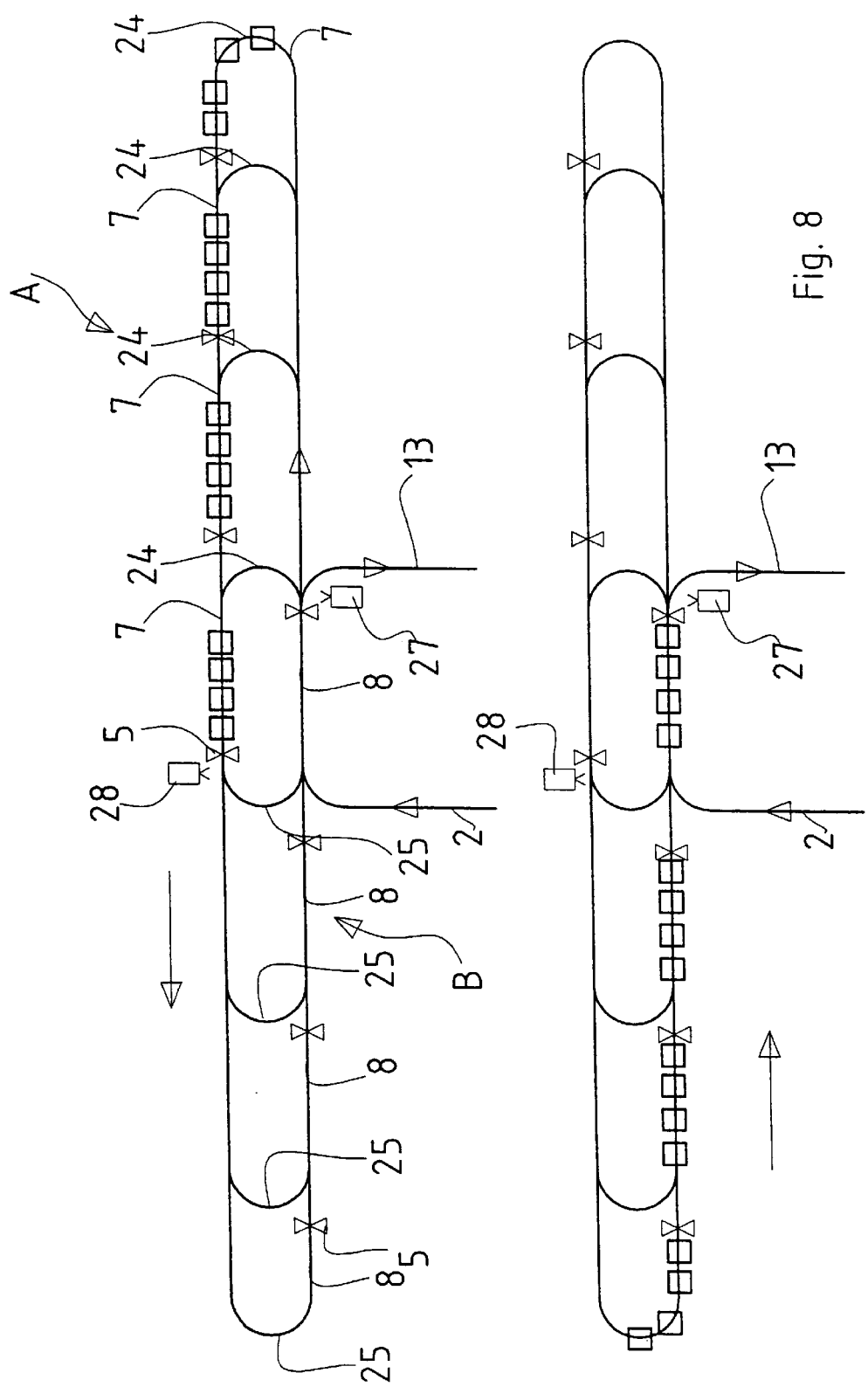
FIG. 8 shows another exemplifying embodiment of the sorting installation according to the invention, with parking sections connected in series behind one another inside the blocks of parking sections.
Figure 9:
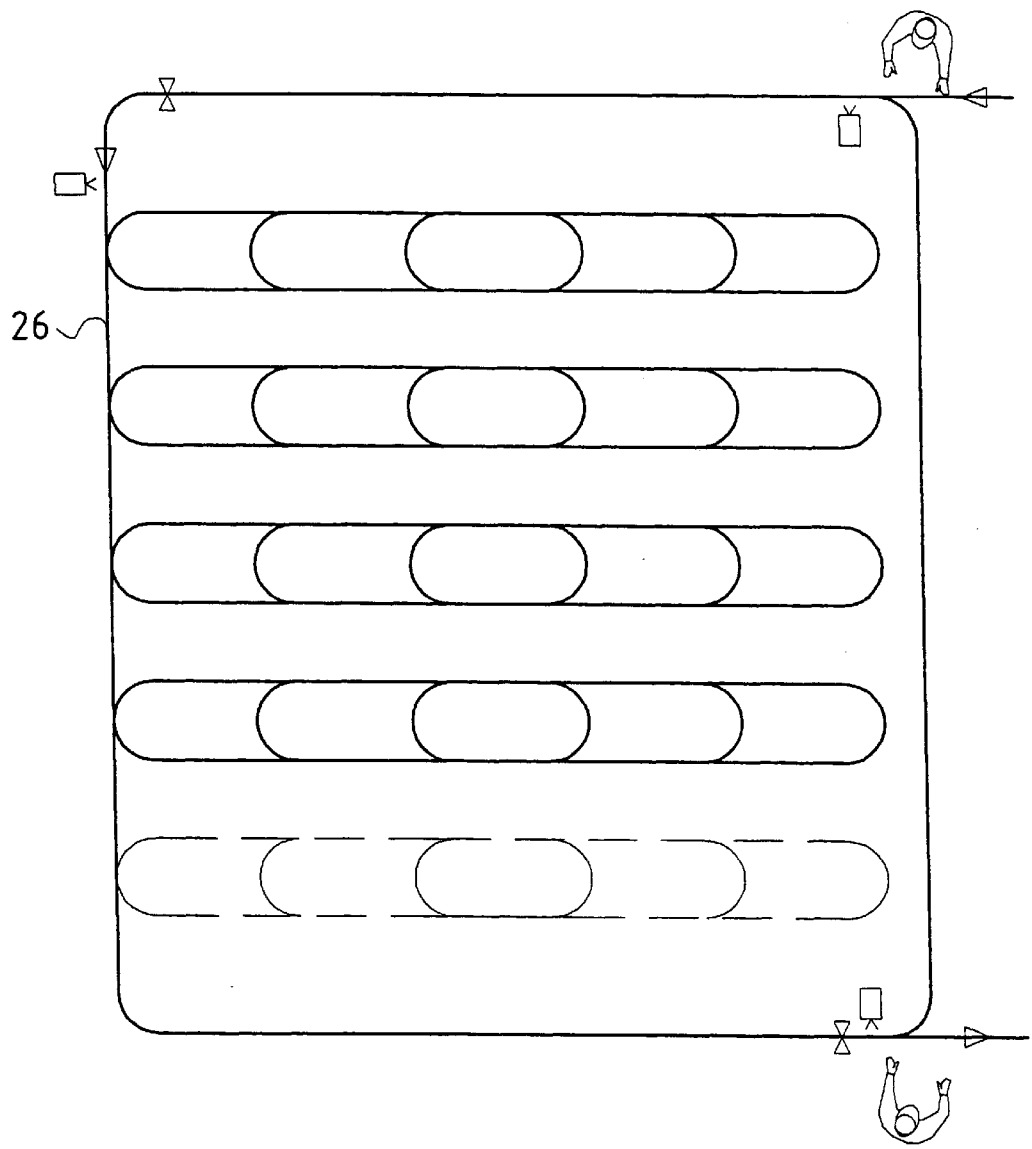
FIG. 9 shows a sorting system having a plurality of sorting installations which are connected in parallel by means of a transfer section which connects them together.
Figure 10:
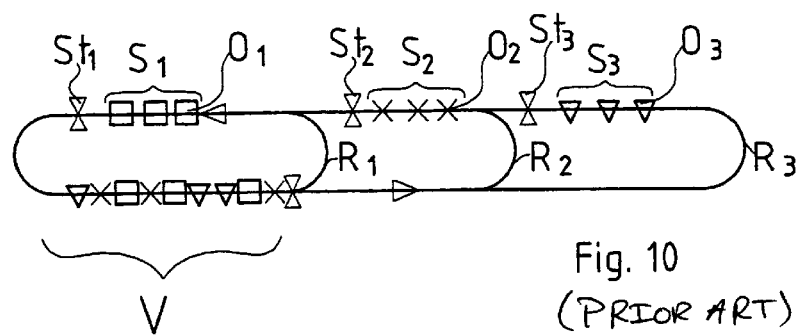
FIG. 10 shows a schematised view of a first prior art sorting installation.
Figure 11:
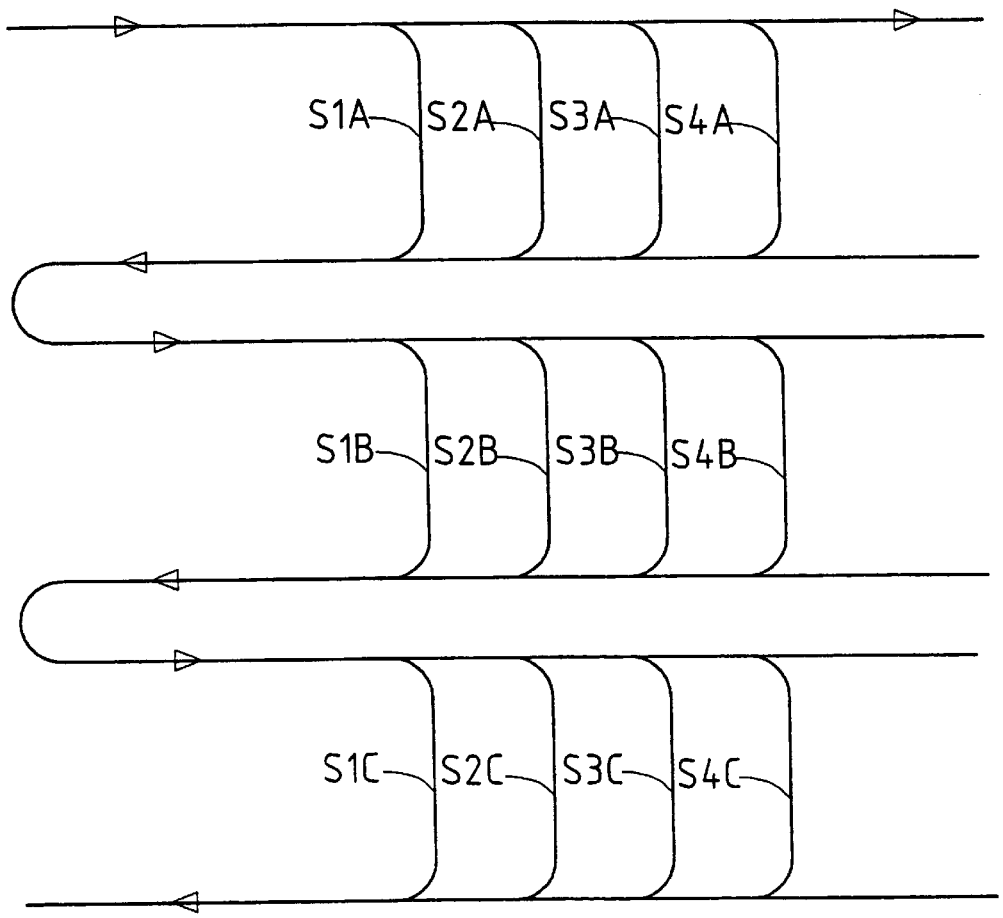
FIG. 11 shows a schematised view of a second prior art sorting installation.

FIGS. 8 and 9 depict another exemplifying embodiment of the invention. Similar details and elements have been given the same reference numbers as in the exemplifying embodiments seen in FIGS. 1 to 7. As also in the case of these exemplifying embodiments, the parking sections 7 and 8 are divided into two blocks A and B, and for every second and additional sort run a direct handover of the objects takes place from block A to block B, and vice versa. However, one essential difference is the fact that the parking sections, 7 and 8 respectively, are connected to run in series behind one another, rather than parallel to one another as in the examples seen in FIGS. 1 to 7. To put this another way, it could also be said that the objects are parked on the transfer section and not, or at least not exclusively, on the relocators. However, the relocator can be integrated into the respective parking section, as for instance is the case with the relocators 24, 25 at the left-hand and right-hand end of the sorting installation, but is also possible in respect of relocators situated further inwards.

The objects are also respectively parked behind the stoppers 5 in the case of the exemplifying embodiments seen in FIGS. 8 and 9. Based on the above diagram, the objects are fed into the sorting installation by means of the inputting station 2, identified by means of the first reading station 27, and systematically guided onto the respective desired one of the parking sections 7 by means of the relocators 24. The relocators 24 are controlled on the basis of the identity check performed the reading station 27. Sets of points with a suitably curved track portion, or alternatively transfer wheels, can be used as relocators. Once the objects, represented as small squares, have been guided onto the respective desired one of the parking sections 7 and parked behind the respective stoppers 5, the first sort run is over.

The second sort run is characterised by the fact that the objects are guided by means of the relocators 25 onto the respective desired one of the parking sections 8 and re-parked again behind the respective associated stoppers 8. The reading station 28 is used here to identify and control the relocators 25.

In the case of the third sort run, the first back-transfer of the objects takes place, namely from the second block B to the first block A by means of the relocators 24.

The fourth sort run then resembles the first sort run again—apart from the difference in sequence and parking section affiliation of the objects. In other words, the objects are transferred from block A to block B in a manner that sorts them, and this is done by means of the controlled relocators 25.

This operation can be repeated as often as desired in the further course of the sorting process; in each case a changeover from block A to block B and vice versa takes place, as has already been explained at length with the help of the examples shown in FIGS. 1 to 7.

Finally the sorted objects can be removed from the sorting installation by means of the outputting station 13.

A further increase in flexibility and a still higher sorting output is achieved if a plurality of sorting installations, as depicted in FIG. 9, are arranged in parallel and connected to one another by means of a common transfer section 26.

While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. Sorting method for sorting objects in a sorting installation with at least the following sorting steps:
   (a) in a first sort run, sorting objects into parking sections of a first block of parking sections;
   (b) in a second sort run; sorting by transferring objects from the first block of parking sections into a second block of parking sections; and
   (c) in a third sort run, sorting by transferring objects from the second block of parking sections back to the first block of parking sections.

2. Sorting method as claimed in claim 1, characterised in that the parking sections of the first block are uniformly filled in the first sort run, and in the subsequent sort runs the uniform filling of the parking sections of the first and second block is preserved, irrespective of the number of sort runs.

3. Sorting method as claimed in claim 2, characterised in that the maximum number of objects to be sorted is exoonentially defined by the number of parking sections of a block raised to the power of the number of sort runs.

4. Sorting method as claimed in claim 1, characterised in that three sort runs are carried out.

5. Sorting method as claimed in claim 1, characterised in that more than three sort runs are carried out.

6. Sorting method as claimed in any of claims 1 to 5, characterised in that interposed ahead of the first sort run is an inputting step in which all the objects that are to be sorted are parked ahead of the first block on a preliminary storage section.

7. Sorting method as claimed in any of claims 1 to 5, characterised in that interposed ahead of the first sort run is an inputting step in which a number of objects that exceeds the number of objects that are to be sorted in a complete sorting operation is stored in a buffer store.

8. Sorting installation for sorting a plurality of objects in at least three sort runs, having:
   an inputting station (2) for inputting the objects that are to be sorted into the sorting installation;
   an outputting station (13) for outputting the objects that are to be sorted from the sorting installation; and
   a plurality of parking sections (7, 8) upon which the objects are respectively stored until a respective sort run has ended,
   characterised by
   dividing the parking sections into a first and a second block (A and B, respectively) of parking sections (7 and 8, respectively);
   a first transfer section (9) which connects the inputting station (2) to the first block (A) of parking sections (7) in such a manner that the latter can be filled from the inputting station (2) in a first sorting step;
   a second transfer section (10) which connects the first block (A) to the second block (B) in such a manner that the objects are transferred direct from the first block (A) to the second block (B) in a second sort run; and
   a third transfer section (II) which connects the second block (B) to the first block (A) in such a manner that the objects are transferred direct from the second block (B) back to the first block (A) in a third sort run.

9. Sorting installation as claimed in claim 8, characterised in that the second and third transfer sections (10 and 11, respectively) run in opposite directions and the parking sections (A, B) extend between these transfer sections (10, 11) and are connected thereto, with the result that the parking sections (A, B) at the same time act as relocators which by parking and re-releasing the objects for the next sort run relocate these objects from the second transfer section (10) to the third transfer section (11) running in the opposite direction, and vice versa.

10. Sorting installation as claimed in claim 8 or 9, characterised in that the parking sections (7 and 8, respectively) are arranged parallel to one another within a respective block (A or B) and are identical in length.

11. Sorting installation as claimed in claim 10, characterised in that all the parking sections (7, 8) run parallel to one another irrespective of which block they belong to.

12. Sorting installation as claimed in claim 8 or 9, characterised in that the first transfer section (9) encloses the first block (A) in the shape of a C.

13. Sorting installation as claimed in claim 12, characterised in that the second transfer section (10) runs parallel to a portion of the first transfer section (9).

14. Sorting installation as claimed in claim 8 or 9, characterised in that a preliminary storage section (19) is interposed ahead of the first block (A) of parking sections (7).

15. Sorting installation as claimed in claim characterised in that the length of the preliminary storage section (19) is at least equal to the sum of the lengths of the parking sections (7) of the first block (A).

16. Sorting installation as claimed in claim 8 or 9, characterised in that inserted into the first transfer section (9) is a buffer store (20) which in turn incorporates a plurality of buffer store parking sections (21).

17. Sorting installation as claimed in claim 16, characterised in that one or more parking sections (23) are in each case a constituent part of a closed circuit connected to the first transfer section (9).

18. Sorting installation for sorting a plurality of objects in at least three sort runs, having:
  an inputting station (2) for inputting the objects that are to be sorted into the sorting installation;
  an outputting station (13) for outputting the objects that are to be sorted from the sorting installation; and
  a plurality of parking sections (7, 8) upon which the objects are respectively stored until a respective sort run has ended,
  characterised by
    dividing the parking sections into a first and a second block (A and B, respectively) of parking sections (7 and 8, respectively);
    a connection which joins the inputting station (2) to the first block (A) of parking sections (7) in such a manner that the latter can be filled from the inputting station (2) in a first sorting step;
    a first set of relocators (24) which connects the first block (A) to the second block (B) in such a manner that the objects are transferred from the first block (A) to the second block (B) in a second sort run; and
    a second set of relocators (25) which connects the second block (B) to the first block (A) in such a manner that the objects are transferred from the second block (B) back to the first block (A) in a third sort run.

19. Sorting installation as claimed in claim 18, characterised in that the first and second block (A and B, respectively) of parking sections (7 and 8, respectively) incorporates parking sections arranged in series behind one another, the parking sections (7) of the first block (A) being adapted to be filled in the opposite direction to the parking sections (8) of the second block (B), and vice versa.

20. Sorting installation as claimed in claim 19, characterised in that at least one of the relocators (24, 25) forms part of a parking section (7, 8) or a complete parking section.

21. Sorting installation as claimed in any of claims 18 to 20, characterised in that at least one of the parking sections (7, 8) of the first block (A) runs parallel to at least one of the parking sections of the second block (B).

22. Sorting installation as claimed in claim 18 or 19, characterised in that all the parking sections (7) of the first block (A) run parallel to all the parking sections (8) of the second block (B).

23. Sorting installation as claimed in any of claims 18 to 20, characterised in that interposed ahead of the first block (A) of parking sections (7) is a preliminary storage section.

24. Sorting installation as claimed in claim 23, characterised in that the length of the preliminary storage section is at least equal to the sum of the lengths of the parking sections (7) of the first block (A).

25. Sorting system, characterised in that a plurality of sorting installations as claimed in any of claims 8, 9, 18–20 are connected in series behind one another by means of a transfer section (26) which connects them together.

26. Sorting system, characterised in that a plurality of sorting installations as claimed in any of claims 8, 9, 18–20 are connected parallel by means of a transfer section (26) which connects them together.

* * * * *